UNITED STATES PATENT OFFICE.

MANETHO C. JACKSON, OF MADISON, WISCONSIN.

CEREAL FOOD.

No. 913,011.  Specification of Letters Patent.  Patented Feb. 23, 1909.

Application filed January 9, 1908. Serial No. 410,016.

*To all whom it may concern:*

Be it known that I, MANETHO C. JACKSON, a citizen of the United States, residing at Madison, county of Dane, and State of Wisconsin, have invented certain new and useful Improvements in Cereal Foods, of which the following is a specification.

My invention relates to cereals and the object of my invention is to provide an improved cereal compound to be used in making various products of the culinary art, such as, muffins, griddle cakes, pastry, and the like.

The cereal compound embodying my invention consists generally in a compound of popcorn, popped and flaked and wheat combined in the proper proportions. The wheat may be in the form of the ordinary wheat flour, or may be parched and flaked as desired.

The preferred proportions for the mixture are equal parts by bulk of each. Although I do not limit my invention to the proportions mentioned, I prefer the same, having made extensive experiments to ascertain the best proportions.

The cereal compound comprises: popcorn popped and flaked one part by bulk, and wheat one part by bulk.

What I claim is:

1. A cereal compound for culinary use comprising a mixture of popcorn, popped and flaked, and comminuted wheat substantially in the proportions specified.

2. A cereal compound comprising popcorn, popped and flaked and comminuted wheat, combined in substantially equal proportions by bulk.

3. A cereal compound comprising popped popcorn finely flaked and wheat flour combined in substantially equal proportions by bulk.

4. A cereal compound consisting in popped popcorn, flaked and cooked wheat flakes substantially in the proportions specified.

In testimony whereof I have signed my name to this specification in the presence of two subscribing witnesses.

MANETHO C. JACKSON.

Witnesses:
S. L. SHELDON,
EDW. J. REYNOLDS.